United States Patent
Rajauria et al.

(10) Patent No.: US 10,283,145 B2
(45) Date of Patent: May 7, 2019

(54) ELECTROMAGNETICALLY-SHIELDED NEAR-FIELD TRANSDUCER THERMAL SENSOR FOR HEAT-ASSISTED MAGNETIC RECORDING

(71) Applicant: Western Digital Technologies, Inc., San Jose, CA (US)

(72) Inventors: Sukumar Rajauria, San Jose, CA (US); Wan Kuang, Boise, ID (US); Takuya Matsumoto, Sunnyvale, CA (US); Robert Smith, Sunnyvale, CA (US); Erhard Schreck, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/691,620

(22) Filed: Aug. 30, 2017

(65) Prior Publication Data

US 2019/0066725 A1    Feb. 28, 2019

(51) Int. Cl.

| | |
|---|---|
| *G11B 5/31* | (2006.01) |
| *G11B 5/10* | (2006.01) |
| *G11B 13/08* | (2006.01) |
| *G11B 5/60* | (2006.01) |
| *G11B 5/11* | (2006.01) |
| *G11B 5/00* | (2006.01) |
| *G11B 5/127* | (2006.01) |

(52) U.S. Cl.
CPC .............. *G11B 5/314* (2013.01); *G11B 5/10* (2013.01); *G11B 5/112* (2013.01); *G11B 5/3163* (2013.01); *G11B 5/6088* (2013.01); *G11B 13/08* (2013.01); *G11B 5/1278* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 8,036,069 B1 * | 10/2011 | Jin et al. | ................ | G11B 5/314 |
| | | | | 360/59 |
| 8,451,696 B2 | 5/2013 | Huang et al. | | |
| 8,619,515 B1 | 12/2013 | Matsumoto et al. | | |
| 8,654,618 B1 * | 2/2014 | Liu et al. | ................ | G11B 5/314 |
| | | | | 369/13.33 |
| 8,705,323 B2 | 4/2014 | Contreras et al. | | |
| 8,842,383 B1 | 9/2014 | Balamane et al. | | |
| 10,056,101 B1 * | 8/2018 | Wessel | ................ | G11B 5/6088 |
| 2011/0013669 A1 | 1/2011 | Raj et al. | | |
| 2012/0201108 A1 * | 8/2012 | Zheng et al. | ........ | G11B 5/6088 |
| | | | | 360/59 |
| 2013/0258824 A1 | 10/2013 | Komura et al. | | |

* cited by examiner

*Primary Examiner* — Craig A. Renner (57) ABSTRACT

Disclosed herein are write heads for data storage devices, methods for making and using such write heads, and data storage devices comprising such write heads. A write head comprises a near-field transducer (NFT), a thermal sensor, and a shield disposed between the NFT and the thermal sensor, wherein the shield comprises a magnetic or conductive material, such as, for example, Cu, Ag, Au, Al, Rh, Ti, Cr, Mo, Fe, Co, or Ni or an alloy that includes Cu, Ag, Au, Al, Rh, Ti, Cr, Mo, Fe, Co, and/or Ni. In some embodiments, the thermal sensor comprises a first lead and a second lead, and the shield is connected to the first lead but not the second lead to provide heat sinking for the shield.

20 Claims, 8 Drawing Sheets

ELECTROMAGNETICALLY-SHIELDED NEAR-FIELD TRANSDUCER THERMAL SENSOR FOR HEAT-ASSISTED MAGNETIC RECORDING

BACKGROUND

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In HAMR, a magnetic recording material with high magneto-crystalline anisotropy ($K_u$) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the disk surface. A NFT may have a generally triangular output end, such that an evanescent wave generated at a surface of the waveguide couples to surface plasmons excited on the surface of the NFT, and a strong optical near-field is generated at the apex of the triangular output end.

Because of its function, the NFT can reach high temperatures, which, if left uncorrected or continuing for too long a period of time, can cause HAMR drive failures. Thus, it is important to monitor the temperature at the NFT. To monitor the temperature of the NFT, HAMR disk drives may include a thermal sensor. In prior-art designs, optical coupling between the thermal sensor and the NFT leads to an undesirable and unstable background signal, which reduces the accuracy of the temperature readings and hinders the deployment of measures to improve NFT reliability.

Therefore, there is an ongoing need to improve monitoring of the temperature of the NFT.

SUMMARY

Disclosed herein are write heads for data storage devices, methods for making and using such write heads, and data storage devices (e.g., hard disk drives) comprising such write heads. A write head comprises a near-field transducer (NFT), a thermal sensor, and a shield disposed between the NFT and the thermal sensor, wherein the shield comprises a magnetic or conductive material, such as, for example, Cu, Ag, Au, Al, Rh, Ti, Cr, Mo, Fe, Co, or Ni or an alloy that includes Cu, Ag, Au, Al, Rh, Ti, Cr, Mo, Fe, Co, and/or Ni. In some embodiments, the shield comprises a multilayer having at least a first material with a first refractive index and a second material with a second refractive index. In some embodiments, a thickness of the shield is greater than approximately 20 nm. In some embodiments, a cross-sectional area of the shield is greater than a cross-sectional area of the thermal sensor. In some embodiments, a distance between the shield and the thermal sensor is between approximately 10 nm and approximately 1000 nm. In some embodiments, the shield extends within approximately 0 nm to approximately 1000 nm of an air-bearing surface of the write head. In some embodiments, the thermal sensor comprises a first lead and a second lead, and the shield is connected to the first lead but not the second lead.

A method for manufacturing a write head comprises forming an NFT, forming a thermal sensor, and forming a shield between the NFT and the thermal sensor, wherein the shield comprises a magnetic or conductive material (e.g., Cu, Ag, Au, Al, Rh, Ti, Cr, Mo, Fe, Co, or Ni, or an alloy comprising Cu, Ag, Au, Al, Rh, Ti, Cr, Mo, Fe, Co, or Ni). In some embodiments, the thermal sensor comprises a first lead and a second lead, and forming the shield or forming the thermal sensor comprises connecting the shield to the first lead but not to the second lead. In some embodiments, a thickness of the shield is greater than approximately 20 nm.

A method of controlling a characteristic of a write head that includes a shield positioned between a NFT and a thermal sensor comprises obtaining a signal from the thermal sensor and controlling the characteristic based at least in part on the signal obtained from the thermal sensor. The characteristic may be, for example, an amplitude, wavelength, or frequency of a light source (e.g., a laser) used in conjunction with the NFT. In some embodiments, the characteristic is an amplitude of a voltage. In some such embodiments, a current caused by the voltage may be measured subsequently. In some embodiments, the signal is a first signal, and the method further comprises obtaining a second signal from the thermal sensor and controlling the characteristic based at least in part on the second signal obtained from the thermal sensor. In some embodiments, the signal is a first signal and the characteristic is a first characteristic, and the method further comprises obtaining a second signal from the thermal sensor and controlling a second characteristic based at least in part on the second signal obtained from the thermal sensor.

BRIEF DESCRIPTION OF THE DRAWINGS

Objects, features, and advantages of the disclosure will be readily apparent from the following description of certain embodiments taken in conjunction with the accompanying drawings in which.

DETAILED DESCRIPTION

In HAMR devices, NFT reliability is important because NFT failures can cause failures. If the NFT's behavior can be monitored accurately, measures can be taken to counteract undesirable behavior and/or to mitigate performance problems. For example, the power provided to the NFT may be reduced if the NFT's temperature becomes too high to prevent the NFT from deforming.

A variety of events can cause the temperature of the NFT to change (e.g., increase). These events include write touchdown, smear-induced back-heating (e.g., unknown material touches the NFT), NFT degradation over time (e.g., deformation), and optical power fluctuations. Therefore, it is important to monitor the temperature of the NFT. For example, a thermal sensor may be positioned in the vicinity of the NFT to detect temperature changes of the NFT.

To detect the temperature of the NFT accurately, it is desirable to position the thermal sensor in close proximity to the NFT. But light flowing in the waveguide can leak out and heat not only the desired region of the disk, but also the NFT itself and any nearby elements of the write head, including the thermal sensor. Consequently, when the thermal sensor is located near the NFT, the accuracy of its readings is compromised because the thermal sensor detects not only the desired NFT temperature, but also an undesired and unstable high background signal caused by optical coupling between the thermal sensor and the waveguide or NFT. This noise signal can overwhelm the desired NFT temperature signal detected by the thermal sensor, thereby reducing or eliminating altogether the effectiveness of thermal sensor to monitor the temperature of the NFT. Thus, there is a need for novel approaches that simultaneously allow the thermal sensor to be positioned near the NFT while reducing the effect of background electromagnetic radiation on the accuracy of the thermal sensor's readings.

Disclosed herein are data storage device write heads that include a conducting or magnetic shield between the NFT and the thermal sensor. The shield, which is made from a magnetic or conductive material, reflects light leaking from the waveguide back toward the waveguide to reduce coupling between the thermal sensor and the waveguide and to reduce the effect of electromagnetic radiation leakage on the thermal sensor's NFT temperature measurements. As a result, the thermal sensor may be positioned in close proximity to the NFT and can more accurately detect NFT temperature changes.

Figure 1:
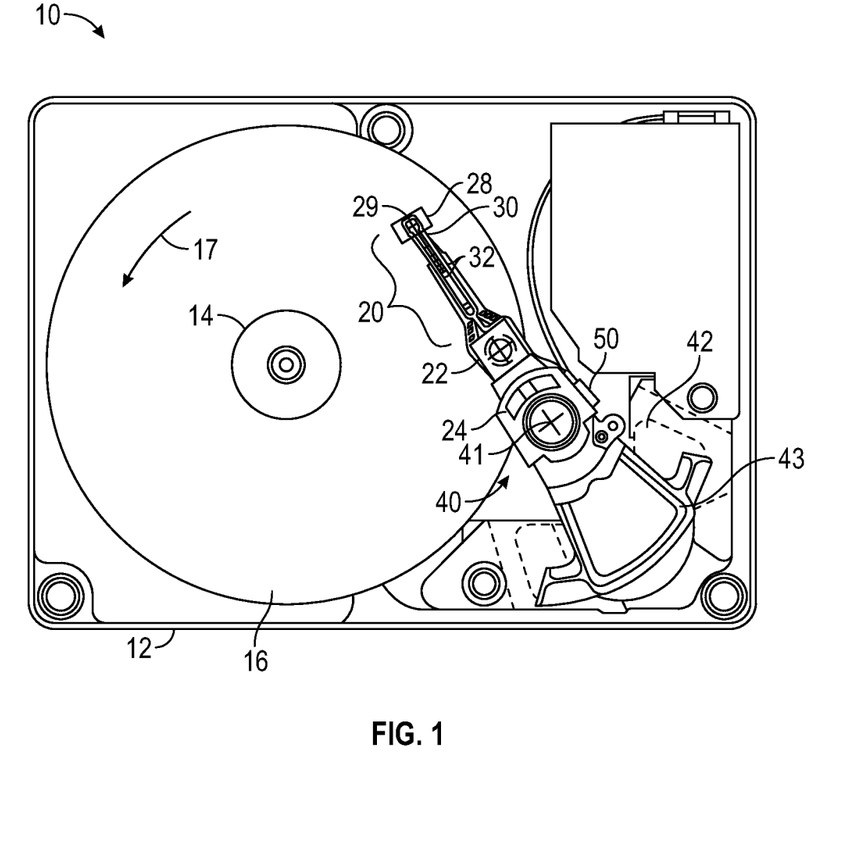
FIG. 1 illustrates a hard disk drive into which the embodiments disclosed herein may be incorporated.

FIG. 1 is a top view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing surface of slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC).

As the disk 16 rotates, the disk 16 drags air under the slider 28 and along the air-bearing surface (ABS) of the slider 28 in a direction approximately parallel to the tangential velocity of the disk 16. As the air passes under the ABS, air compression along the air flow path causes the air pressure between the disk 16 and the ABS to increase, which creates a hydrodynamic lifting force that counteracts the tendency of the at least one load beam assembly 20 to push the slider 28 toward the disk 16. The slider 28 thus flies above the disk 16 but in close proximity to the surface of the disk 16.

The slider 28 supports a read/write head 29, which in at least some of the embodiments disclosed herein is a HAMR head that includes an inductive write head, the NFT, and an optical waveguide. (As stated previously, the term "HAMR" as used herein refers to all variants of thermally-assisted recording, including TAR, TAMR, EAMR, and HAMR.) A semiconductor laser with a wavelength of 780 to 980 nm may be used as the HAMR light source. The laser may be supported on the top of the slider 28, or it may be located on the flexure 30 and coupled to the slider 28 by an optical channel. As the disk 16 rotates in the direction of the arrow 17, the movement of the actuator assembly 40 allows the HAMR head on the slider 28 to access different data tracks on the disk 16. The slider 28 is typically formed of a composite material, such as a composite of alumina/titanium-carbide ($Al_2O_3$/TiC). FIG. 1 illustrates only one disk 16 surface with associated slider 28 and read/write head 29, but there may be multiple disks 16 stacked on a hub that is rotated by a spindle motor, with a separate slider 28 and read/write head 29 associated with each surface of each disk 16.

In operation, after the voice coil 43 has positioned the read/write head 29 over the data tracks on the disk 16, the read/write head 29 may be used to write information to one or more tracks on the surface of the disk 16 and to read previously-recorded information from the tracks on the surface of the disk 16. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

Figure 2:
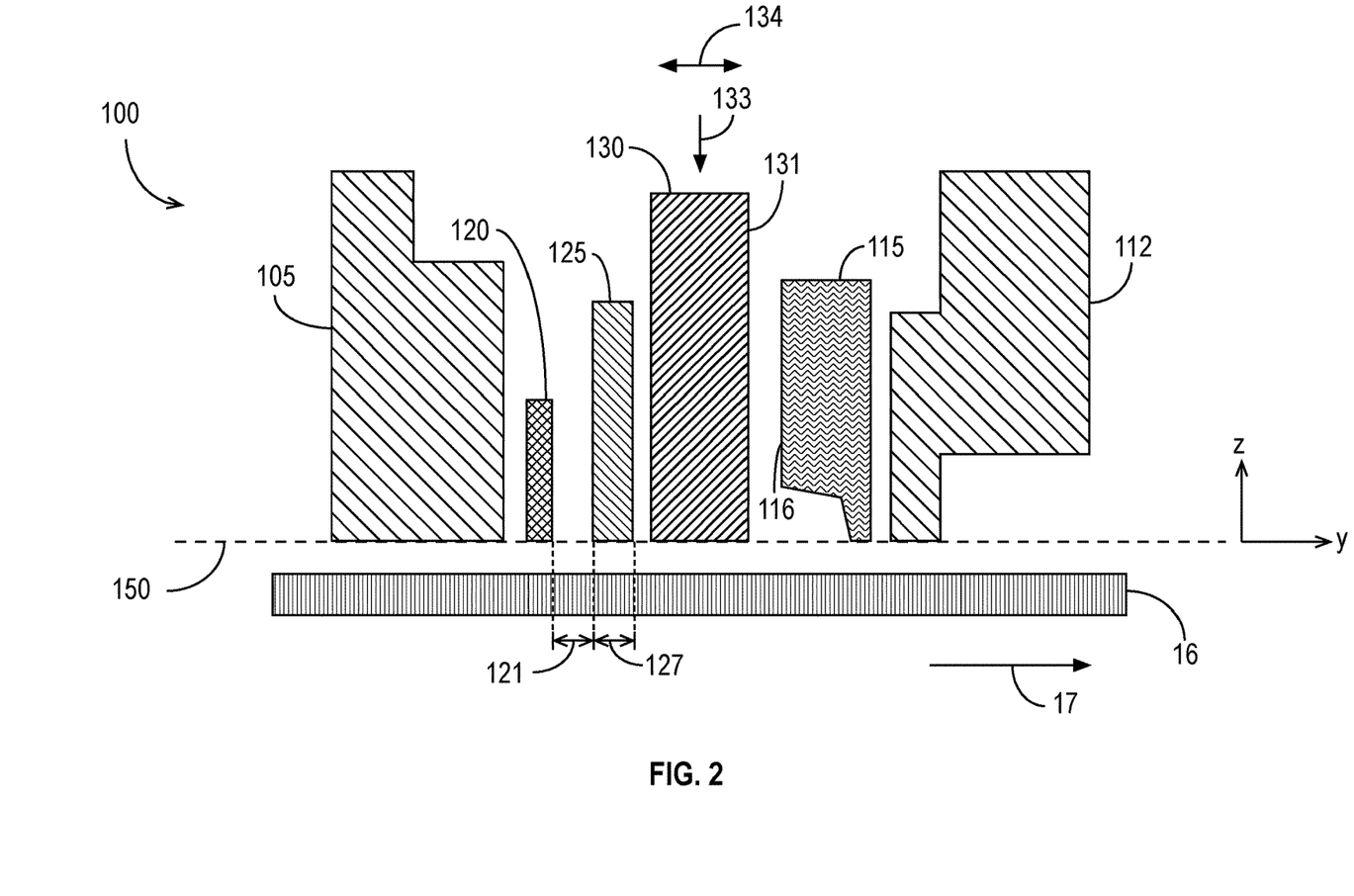
FIG. 2 is a cross-sectional schematic of a HAMR-enabled write head in accordance with some embodiments.

FIG. 2 is a cross-sectional schematic of a HAMR-enabled write head 100 in accordance with some embodiments. FIG. 2 shows the write pole 112, the NFT 115, the waveguide 130, the thermal sensor 120, and the return pole 105 in relation to the disk 16, which moves in the direction of the arrow 17. Also illustrated is the shield 125, which is situated between the NFT 115 and the thermal sensor 120 (and between the waveguide 130 and the thermal sensor 120). The shield 125 is situated a distance 121 from the thermal sensor 120. In some embodiments, the distance 121 is between approximately 10 nm and approximately 1000 nm. In the embodiment of FIG. 2, the shield 125 extends to the ABS 150 of the slider 28 on which the write head 100 resides. In other embodiments, the shield 125 is recessed from the ABS 150. For example, the shield 125 may be recessed from the ABS 150 by up to approximately 1000 nm.

In FIG. 2, the unshaded regions of the write head 100 are typically formed of an insulating material such as, for example, alumina ($Al_2O_3$). The write pole 112 is typically a layer of high-moment material such as, for example, FeCo and has a pole tip at the ABS 150. The waveguide 130 may be a layer of core material generally parallel to the write pole 112 layer with a length orthogonal to the ABS 150, an end at the ABS 150, and a generally planar surface 131 that faces and is parallel to the layer of material making up the NFT 115. The NFT 115 layer may comprise a conductive low-loss metal (e.g., Au, Ag, Al, or Cu), is generally parallel to the waveguide 130 layer and write pole 112 layer, and is located between and spaced from the waveguide 130 layer and the write pole 112 layer. The NFT 115 layer has a surface 116 that faces and is parallel to and spaced from the surface 131 of the waveguide 130. The NFT 115 layer has an output end at the ABS 150 and an input end that is recessed from the ABS 150. When light is introduced into the waveguide 130, an evanescent wave is generated at the waveguide surface 131 and couples to a surface plasmon excited on the surface 116 of the NFT 115. Arrow 133 shows the direction of propagation of light in waveguide 130, and arrow 134 shows the direction of polarization of the light. The surface plasmon propagates to the NFT 115 output end at the ABS 150.

Figure 6:
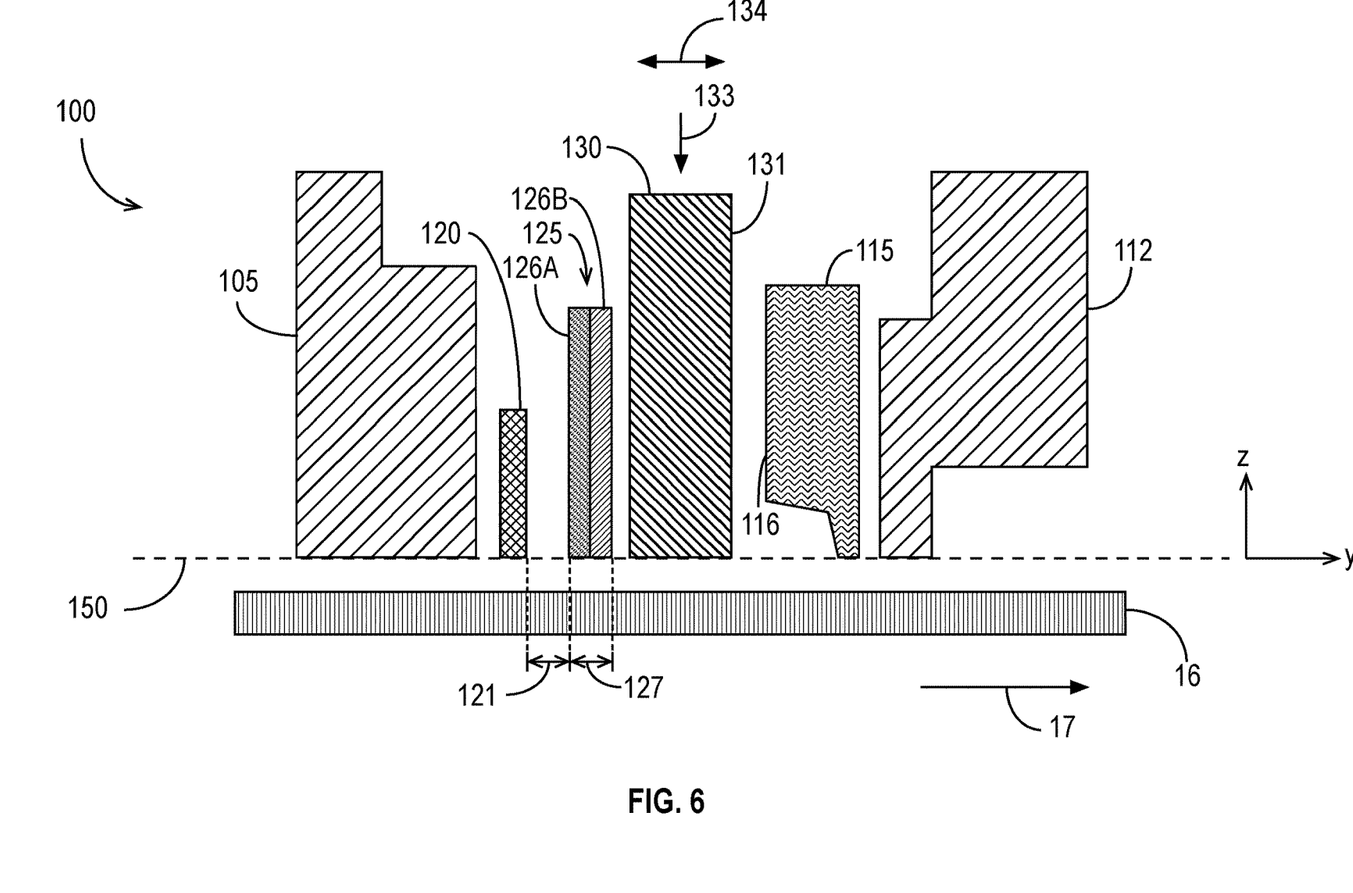
FIG. 6 is a cross-sectional schematic of a HAMR-enabled write head having a shield comprising a multilayer in accordance with some embodiments.

The shield 125 is situated on the other side of the waveguide 130 from the NFT 115. The shield 125 comprises a magnetic or conductive material. In some embodiments, the magnetic or conductive material comprises, for example, Cu, Ag, Au, Al, Rh, Ti, Cr, Mo, Fe, Co, or Ni. In some embodiments, the magnetic or conductive material comprises a metal alloy that includes, for example, Cu, Ag, Au, Al, Rh, Ti, Cr, Mo, Fe, Co, and/or Ni. In some embodiments, such as illustrated in FIG. 6, the shield 125 comprises a multilayer having at least a first material 126A with a first refractive index and a second material 126B with a second refractive index. For example, the material closest to the thermal sensor 120 may be a low-loss material to reduce its impact on the thermal sensor 120 signal.

Figure 3A:
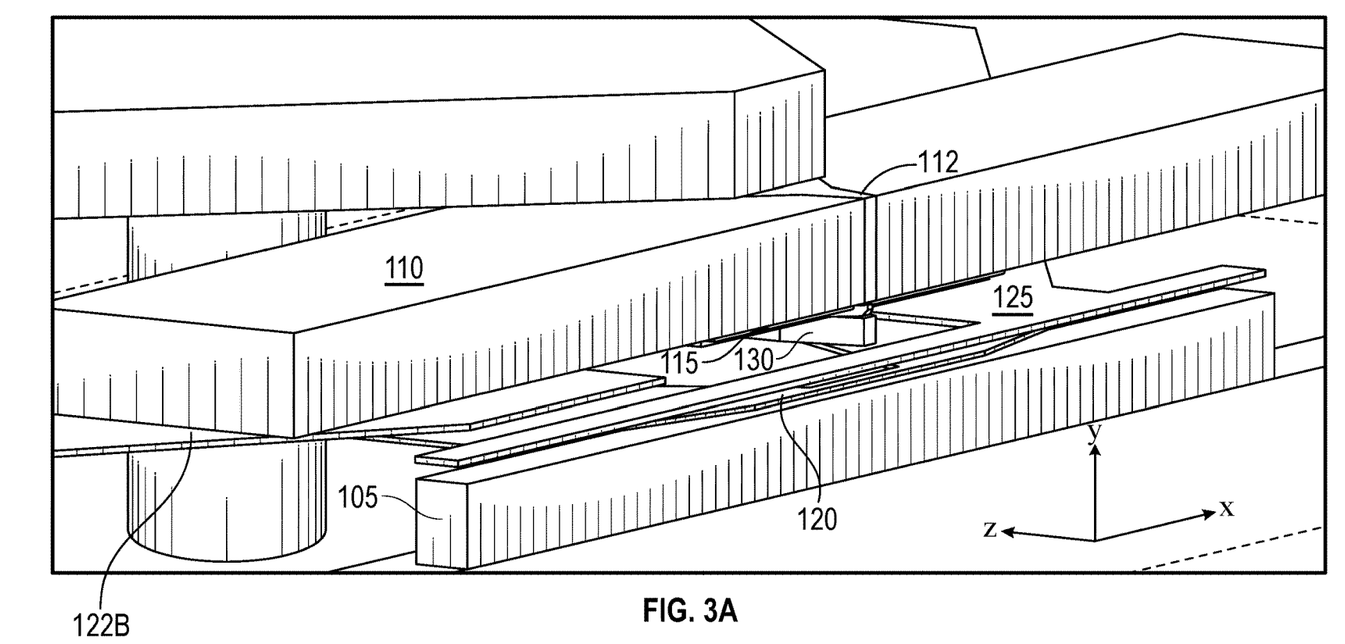
FIGS. 3A-3C are perspective views of the air-bearing surface of a write head with a shield in accordance with some embodiments.
Figure 3B:
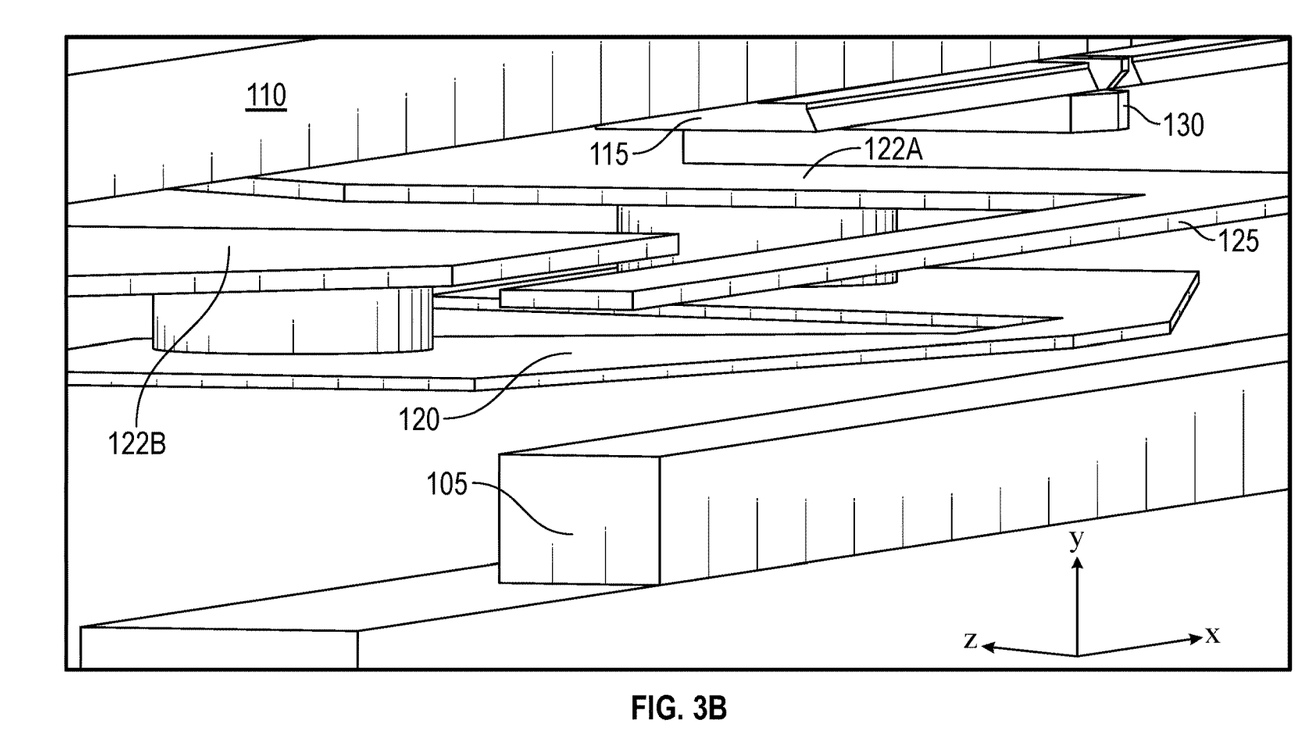
Figure 3C:
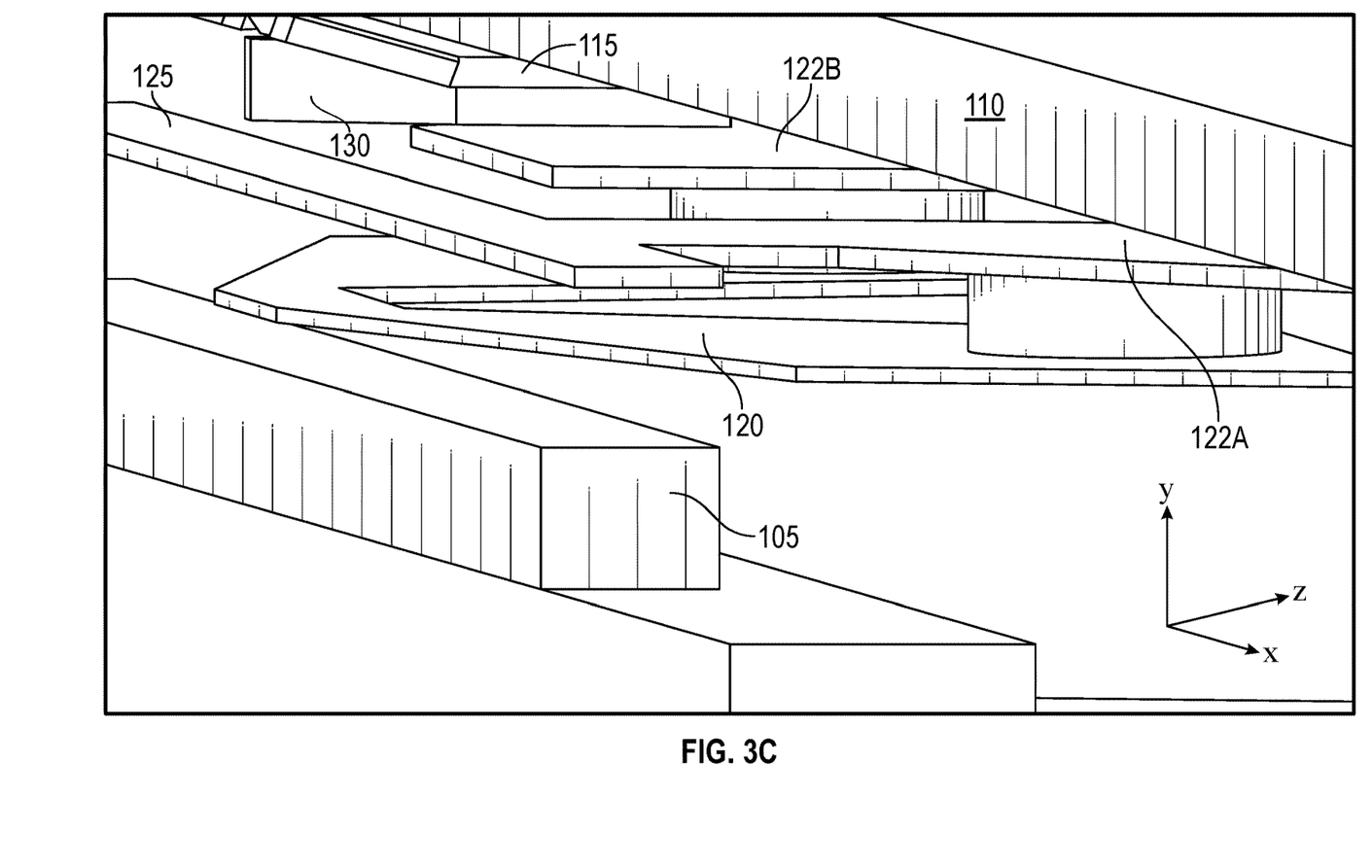

FIGS. 3A-3C are perspective views of the ABS 150 of the write head 100 with a shield 125 in accordance with some embodiments. FIGS. 3A-3C illustrate the write head 100 without any of the insulating material (e.g., alumina ($Al_2O_3$) or the like) that occupies what appears in FIGS. 3A-3C to be open space between elements of the write head 100. The x-axis shown in FIGS. 3A-3C is in the cross-track direction, and the y-axis is in the down-track direction and points in the direction in which the disk 16 moves relative to the write head 100 (i.e., as shown by the arrow 17 of FIGS. 1 and 2).

FIG. 3A illustrates the orientations of the main pole 112, the NFT 115, the waveguide 130, the shield 125, and the thermal sensor 120. Also illustrated are a heat sink 110, the return pole 105, and a sensor lead 122B. FIGS. 3B and 3C are closer views of the elements of the write head 100 of FIG. 3A from different perspectives. As shown in FIGS. 3A-3C, the shield 125 is disposed between the thermal sensor 120 and the waveguide 130 and NFT 115. The shield 125 extends in the cross-track direction over a width that greatly exceeds the track width (which is roughly equal to the width of the main pole 112). In some embodiments, such as illustrated in FIGS. 3A-3C, the cross-sectional area of the shield 125 in the x-z plane is larger than the cross-sectional area of the thermal sensor 120 in the x-z plane.

Because the shield 125 is located near the waveguide 130, and the shield 125 comprises a magnetic or conductive material, the shield 125 absorbs some of the light leaking from the waveguide 130. As a consequence, the shield 125 becomes hot as the head 100 operates. Therefore, in some embodiments, the shield 125 is electrically connected to a lead 122A of the thermal sensor 120 so that the lead 122A provides heat sinking for the shield 125. FIGS. 3B and 3C illustrate one such embodiment. The thermal sensor 120 has a first lead 122A and a second lead 122B, and the shield 125 is electrically connected to the first lead 122A, but not to the second lead 122B. This configuration provides heat sinking for the shield 125. It is to be understood that heat sinking for the shield 125 may be provided in other ways. For example, the shield 125 may be electrically connected to the second lead 122B and not the first lead 122A. As another alternative, the shield 125 may be electrically connected to some other part of the write head 100 that can provide heat sinking for the shield 125. For example, the shield 125 may be electrically connected to the writer core. As another example, the return pole 105 could be a heat sink.

Referring again to FIG. 2, the shield 125 has a thickness 127 at the ABS 150. Because one purpose of the shield 125 is to reduce the effect of light leaking from the waveguide 130 on the performance of the thermal sensor 120, the thickness 127 should be relatively large. On the other hand, selecting a larger thickness 127 increases the distance between the NFT 115 and the thermal sensor 120, which reduces the ability of the thermal sensor 120 to accurately sense the temperature (or temperature changes) of the NFT 115. Therefore, the thickness 127 of the shield may be selected and/or optimized (e.g., using simulations) to account for the design of the write head 100 and the materials used in the write head 100 (e.g., the material selected for the shield 125).

Figure 4:
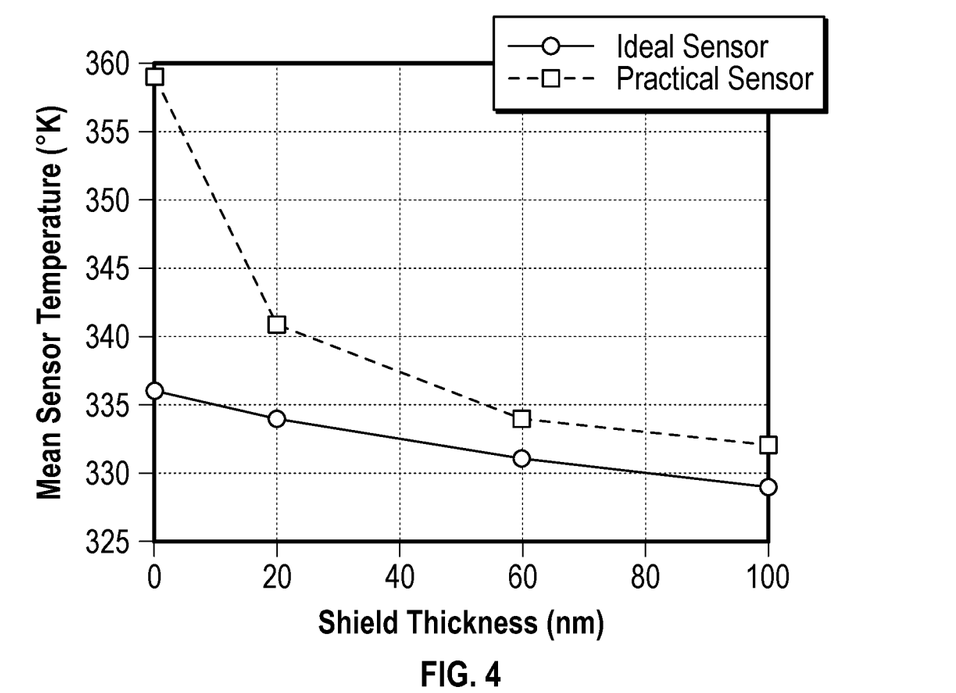
FIG. 4 is a plot illustrating the impact of the shield thickness on the accuracy of the thermal sensor in accordance with some embodiments.

FIG. 4 is a plot of a simulation illustrating the impact of the shield 125 thickness 127 on the accuracy of the thermal sensor 120. FIG. 4 shows the ideal thermal sensor 120 temperature reading (the curve labeled "Ideal Sensor") compared to the temperature reading provided by a thermal sensor 120 when the write head 100 includes a shield 125 between the NFT 115 and the thermal sensor 120 in accordance with embodiments disclosed herein (the curve labeled "Practical Sensor"). The temperature readings of the ideal thermal sensor 120 do not include any effects from stray electromagnetic radiation from the waveguide 130, and therefore the ideal thermal sensor 120 provides a perfect reading of the temperature of the NFT 115. FIG. 4 shows that shield 125 thicknesses 127 less than approximately 20 nm result in a relatively large difference between the temperatures sensed by the ideal thermal sensor 120 and the thermal sensor 120 with a shield 125 between it and the waveguide 130. Therefore, FIG. 4 indicates that, under the simulated conditions, a shield 125 thickness 127 of less than about 20 nm does not sufficiently block or absorb electromagnetic radiation from the waveguide 130, and, under the simulated conditions, a shield thickness 127 of at least about 20 nm is preferable. Shield thicknesses 127 of 60 nm or greater result in the practical thermal sensor 120 providing temperature readings within about 3 degrees Kelvin of the ideal thermal sensor 120 under the simulated conditions. Thus, for the simulated conditions, a shield 125 thickness 127 of at least 50-60 nm is desirable. FIG. 4 illustrates the results of simulations for a particular write head 100 (e.g., accounting for materials used, dimensions, etc.). It is within the skill of a person having ordinary skill in the art to perform similar situations to select the shield 125 material and thickness 127 for alternative write head 100 designs.

Figure 5:
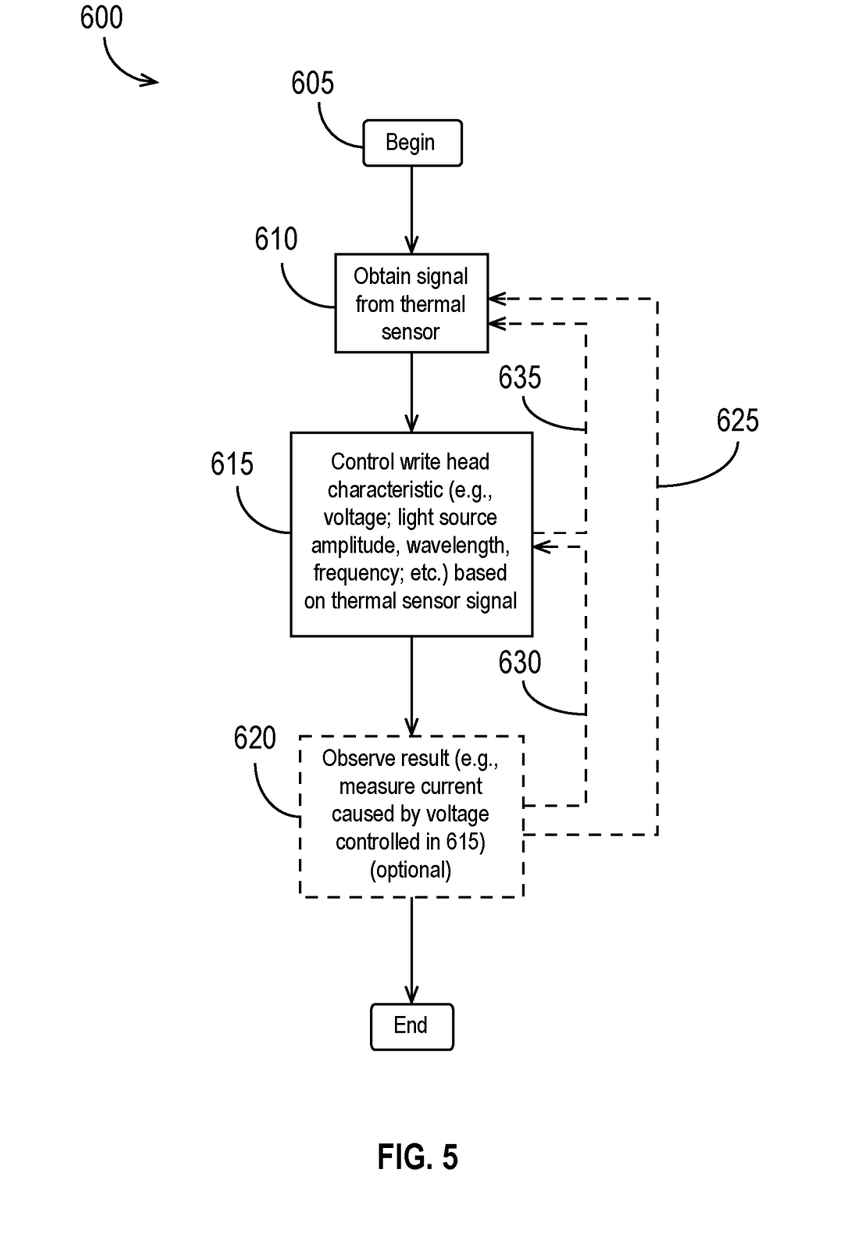
FIG. 5 is a flowchart illustrating a method of controlling a characteristic of a write head in accordance with some embodiments.

FIG. 5 is a flowchart illustrating a method 600 in accordance with some embodiments. At 605, the method 600 begins. At 610, a signal is obtained from the thermal sensor 120. The signal may be, for example, a temperature reading, a temperature change reading, or a signal (e.g., a voltage, current, or resistance) representative of a temperature or a change in temperature (e.g., relative to a known reference). At 615, at least one characteristic of the write head 100 is controlled based at least in part on the signal obtained from the thermal sensor 120. The at least one characteristic may be any characteristic of the write head 100, including, for example, a voltage provided to an element (e.g., the NFT 115, the write pole 112, the thermal sensor 120, or any other portion) of the write head 100. The characteristic may be, for example, an amplitude, wavelength, and/or frequency of a light source (e.g., a laser) used in conjunction with the NFT 115. Thus, at 615, the thermal sensor 120 temperature reading may be used to adjust those characteristics that can affect the accuracy, robustness, and reliability of the NFT 115. Optionally, the method 600 loops back via arrow 635, and a second signal is obtained from the thermal sensor 120 at 610, and at least one write head characteristic, which may be the same as or different from the at least one characteristic previously controlled, is controlled at 615. For example, if the amplitude of a light source used with the NFT 115 was previously adjusted, its wavelength may be adjusted following the loop-back 635. As another example, if some characteristic of a light source used with the NFT 115 was previously adjusted, a voltage or current provided to the write pole may subsequently be adjusted.

Optionally, at 620, the result of controlling the at least one characteristic at 615 is observed. For example, if at 615 a voltage amplitude was adjusted, at 620 the resulting current may optionally be measured. As illustrated, if optional block 620 is included, the method 600 may also include optional loop-backs 625 and 630. Optional loop-back 625 allows the substantive steps of the entire method 600 to be repeated, with or without block 620 being included in the repetition. Thus, a first pass may include blocks 610, 615, and 620, whereas one or more subsequent passes may include only blocks 610 and 620. Optional loop-back 630 allows at least one write head 100 characteristic, which may include the same at least one characteristic that was previously controlled or a different at least one characteristic, to be controlled after observing the result of a previously-applied control. Thus, a characteristic previously controlled may be controlled again (e.g., to refine its setting or effect), or a different or additional characteristic may be controlled (e.g., if a light source voltage was previously adjusted, the light source frequency may be adjusted via one of the loop-backs 625, 630; etc.). During each iteration, the optional block 620 is optional, which means that the loop-backs 625 and 630 may or may not be available during a particular iteration. Furthermore, it is to be understood that all loop-backs 625, 630, and 635 are optional.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof Accordingly, the specification and drawings are to be regarded in an illustrative rather than a restrictive sense.

What is claimed is:

1. A write head for a data storage device, the write head comprising:
    a near-field transducer (NFT);
    a thermal sensor comprising a first lead and a second lead; and
    a shield disposed between the NFT and the thermal sensor, wherein the shield comprises a magnetic or conductive material, and wherein the shield is connected to the first lead but not the second lead.

2. The write head recited in claim 1, wherein the magnetic or conductive material is a metal alloy.

3. The write head recited in claim 1, wherein the shield comprises a multilayer having at least a first material with a first refractive index and a second material with a second refractive index.

4. The write head recited in claim 1, wherein a thickness of the shield is greater than approximately 20 nm.

5. The write head recited in claim 1, wherein a cross-sectional area of the shield is greater than a cross-sectional area of the thermal sensor.

6. The write head recited in claim 1, wherein a distance between the shield and the thermal sensor is between approximately 10 nm and approximately 1000 nm.

7. The write head recited in claim 1, wherein the shield extends within approximately 0 nm to approximately 1000 nm of an air-bearing surface of the write head.

8. The write head recited in claim 1, wherein the magnetic or conductive material comprises Cu, Ag, Au, Al, Rh, Ti, Cr, Mo, Fe, Co, or Ni, or an alloy comprising Cu, Ag, Au, Al, Rh, Ti, Cr, Mo, Fe, Co, or Ni.

9. A data storage device comprising the write head recited in claim 1.

10. A method of manufacturing the write head recited in claim 1, the method comprising:
    forming the NFT;
    forming the thermal sensor; and
    forming the shield between the NFT and the thermal sensor, wherein the shield comprises the magnetic or conductive material.

11. The method recited in claim 10, wherein forming the shield or forming the thermal sensor comprises connecting the shield to the first lead but not to the second lead.

12. The method recited in claim 10, wherein the magnetic or conductive material comprises Cu, Ag, Au, Al, Rh, Ti, Cr, Mo, Fe, Co, or Ni, or an alloy comprising Cu, Ag, Au, Al, Rh, Ti, Cr, Mo, Fe, Co, or Ni.

13. The method recited in claim 10, wherein a thickness of the shield is greater than approximately 20 nm.

14. A method of controlling a characteristic of the write head recited in claim 1, the method comprising:
    obtaining a signal from the thermal sensor; and
    controlling the characteristic based at least in part on the signal obtained from the thermal sensor.

15. The method recited in claim 14, wherein the characteristic is an amplitude, wavelength, or frequency of a light source used in conjunction with the NFT.

16. The method recited in claim 15, wherein the light source is a laser.

17. The method recited in claim 14, wherein the characteristic is an amplitude of a voltage.

18. The method recited in claim 17, further comprising measuring a current caused by the voltage.

19. The method recited in claim 14, wherein the signal is a first signal, and further comprising:
    obtaining a second signal from the thermal sensor; and
    controlling the characteristic based at least in part on the second signal obtained from the thermal sensor.

20. The method recited in claim 14, wherein the signal is a first signal and the characteristic is a first characteristic, and further comprising:
    obtaining a second signal from the thermal sensor; and
    controlling a second characteristic based at least in part on the second signal obtained from the thermal sensor.

* * * * *